US010785727B2

(12) United States Patent
Falconetti et al.

(10) Patent No.: US 10,785,727 B2
(45) Date of Patent: Sep. 22, 2020

(54) UPLINK POWER PRIORITIZATION FOR SHORT TTI

(71) Applicant: Telefonaktiebolaget LM Ericsson (publ), Stockholm (SE)

(72) Inventors: Laetitia Falconetti, Järfälla (SE); Gustav Almquist, Järfälla (SE); Daniel Larsson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/337,811

(22) PCT Filed: Sep. 28, 2017

(86) PCT No.: PCT/SE2017/050947
§ 371 (c)(1),
(2) Date: Mar. 28, 2019

(87) PCT Pub. No.: WO2018/063071
PCT Pub. Date: Apr. 5, 2018

(65) Prior Publication Data
US 2019/0230601 A1    Jul. 25, 2019

Related U.S. Application Data

(60) Provisional application No. 62/402,370, filed on Sep. 30, 2016.

(51) Int. Cl.
*H04W 52/14* (2009.01)
*H04W 52/28* (2009.01)
*H04W 52/34* (2009.01)

(52) U.S. Cl.
CPC ....... *H04W 52/146* (2013.01); *H04W 52/281* (2013.01); *H04W 52/34* (2013.01); *H04W 52/346* (2013.01)

(58) Field of Classification Search
CPC .................................................. H04W 52/146
See application file for complete search history.

(56) References Cited

U.S. PATENT DOCUMENTS

| 62,317,447 | * | 4/2016 | Yang | ................... H04W 52/146 |
| 2009/0245190 A1 | * | 10/2009 | Higuchi | .................. H04L 47/22 370/329 |
| 2017/0135116 A1 | * | 5/2017 | Kuchibhotla | ..... H04W 72/0406 |

FOREIGN PATENT DOCUMENTS

| EP | 1 286 490 A1 | 2/2003 |
| RU | 2008 110 963 A1 | 9/2009 |
| WO | 2007 025160 A2 | 3/2007 |

OTHER PUBLICATIONS

PCT International Preliminary Report on Parentability for International application No. PCT/SE2017/050947—dated Jan. 8, 2019.
(Continued)

*Primary Examiner* — Hsinchun Liao
(74) *Attorney, Agent, or Firm* — Baker Botts, LLP

(57) ABSTRACT

Certain embodiments relate to a method for use in a wireless device. The method comprises distributing uplink power among parallel transmissions that the wireless device has scheduled during a subframe on two or more uplink physical channels. The parallel transmissions comprise one or more short transmission time interval, sTTI, transmissions, and the UL power is distributed according to at least one prioritization rule. According to one of the prioritization rules, sTTI transmissions comprising control information are prioritized over sTTI transmissions comprising data without any control information. According to another of the prioritization rules, transmissions with shorter transmission time intervals are prioritized over transmissions with longer transmission time intervals.

32 Claims, 12 Drawing Sheets

(56) References Cited

OTHER PUBLICATIONS

PCT International Search Report for International application No. PCT/SE2017/050947—dated Nov. 24, 2017.
PCT Written Opinion of the International Searching Authority for International application No. PCT/SE2017/050947—dated Nov. 24, 2017.
3GPP TSG RAN WG1 Meeting #86; Gothenburg, Sweden; Source: Huawei, HiSilicon; Title: PUSCH design for short TTI (R1-166153)—Aug. 22-26, 2016.
3GPP TSG RAN WG1 Meeting #86; Gothenburg, Sweden; Source: Nokia, Alcatel-Lucent Shanghai Bell; Title: Simultaneous Transmissions of UL Signals for Shortened TTI Operation (R1-167019)—Aug. 22-26, 2016.
3GPP TSG RAN WG1 Meeting #86; Gothenburg, Sweden; Source: NTT Docomo, Inc.; Title: sPUSCH for shortened TTI (R1-167371)—Aug. 22-26, 2016.
3GPP TSG RAN WG1 Meeting #86; Gothenburg, Sweden; Source: Panasonic; Title: UL simultaneous transmission between sTTI and TTI (R1-166968)—Aug. 22-26, 2016.
3GPP TSG RAN WG1 Meeting #86; Gothenburg, Sweden; Source: ZTE Corp, ZTE Microelectronics; Title: Study on PUSCH transmission in sTTI (R1-167867)—Aug. 22-26, 2016.
3GPP TS 36.213 v15.5.0; Technical Specification; 3rd Generation Partnership Project; Technical Specification Group radio Access Network; Evolved Universal Terrestrial Radio Access (E-UTRA); Physical layer procedures (Release 15)—Mar. 2019.
Substantive Examination issued by the Russian Federal Service for Intellectual Property Federal State Budget Institution for Application No. 2019113068/07 (025198)—Nov. 6, 2019.

* cited by examiner

UPLINK POWER PRIORITIZATION FOR SHORT TTI

PRIORITY

This nonprovisional application is a U.S., National Stage Filing under 35 U.S.C. § 371 of international Patent Application Serial No. PCT/SE2017/050947 filed Sep. 28, 2017 and entitled "Uplink Power Prioritization for Short TTI" which claims priority to U.S. Provisional Patent Application No. 62/402,370 filed Sep. 30, 2016 both of which are hereby incorporated by reference in, their entirety.

TECHNICAL FIELD

The present disclosure relates, in general, to wireless communications and, more particularly, uplink power prioritization for short transmission time interval.

BACKGROUND

Latency Reduction with Short Subframes

Packet data latency is one of the performance metrics that vendors, operators and also end-users (via speed test applications) regularly measure. Latency measurements are done in all phases of a radio access network system's lifetime, for example when verifying a new software release or system component, when deploying a system and when the system is in commercial operation.

Shorter latency than previous generations of 3rd Generation Partnership Project (3GPP) radio access technologies (RATs) was one performance metric that guided the design of Long Term Evolution (LTE). LTE is also now recognized by the end-users to be a system that provides both faster access to internet and lower data latencies than previous generations of mobile radio technologies.

Packet data latency is important not only for the perceived responsiveness of the system; it is also a parameter that indirectly influences the throughput of the system. Hyper Text Transfer Protocol (HTTP)/Transmission Control Protocol (TCP) is the dominating application and transport layer protocol suite used on the internet today. According to HTTP Archive (http://httparchive.org/trends.php), the typical size of HTTP based transactions over the internet are in the range of a few 10 s of Kbyte up to 1 Mbyte. In this size range, the TCP slow start period is a significant part of the total transport period of the packet stream. During TCP slow start, the performance is latency limited. Hence, improved latency can rather easily be shown to improve the average throughput for these types of TCP based data transactions. Radio resource efficiency could be positively impacted by latency reductions. For example, lower packet data latency could increase the number of transmissions possible within a certain delay bound. Hence, higher Block Error Rate (BLER) targets could be used for the data transmissions, freeing up radio resources and potentially improving the capacity of the system.

One area to address when it comes to packet latency reductions is the reduction of transport time of data and control signaling, by addressing the length of a transmission time interval (TTI). In LTE Release 8, a TTI corresponds to one subframe of length 1 millisecond (ms). One such 1 ms TTI is constructed by using 14 Orthogonal Frequency Division Multiplexing (OFDM) or Single Carrier-Frequency Division Multiple Access (SC-FDMA) symbols in the case of normal cyclic prefix (CP) and 12 OFDM or SC-FDMA symbols in the case of extended CP. In LTE Release 13, a study item is starting during 2015 with the goal of specifying transmissions with shorter TTIs that are much shorter than the LTE Release 8 TTI.

The shorter TTIs can be decided to have any duration in time and comprise resources on a number of OFDM or SC-FDMA symbols within a 1 ms subframe. As one example, the duration of the short TTI (sTTI) may be 0.5 ms (i.e., seven OFDM or SC-FDMA symbols for the case with normal cyclic prefix). As another example, the duration of the short TTI may be 2 symbols.

Power Control for PUSCH and sPUSCH

Power control for Physical Uplink Shared Channel (PUSCH) is defined in 3GPP TS 36.213 as, for subframe i and serving cell c, $$P_{PUSCH,c}(i) = \min \begin{cases} 10 \log_{10}(\hat{P}_{CMAX,c}(i) - \hat{P}_{PUCCH}(i)), \\ 10 \log_{10}(M_{PUSCH,c}(i)) + P_{O\_PUSCH,c}(j) + \\ \alpha_c(j) \cdot PL_c + \Delta_{TF,c}(i) + f_c(i) \end{cases},$$

where:

$\hat{P}_{CMAX,c}(i)$ is the maximum transmit power in linear scale;

$\hat{P}_{PUCCH}(i)$ the power of simultaneously transmitted Physical Uplink Control Channel (PUCCH) in linear scale, is equal to zero if no PUCCH is transmitted;

$M_{PUSCH,c}(i)$ is the number of resource blocks (RBs);

$P_{O\_PUSCH,c}(j)$ is the target of received power signaled to the user equipment (UE) over Radio Resource Control (RRC);

$\alpha_c(j) \cdot PL_c$ is the scaled DL path loss estimate, with $0 \leq \alpha_c(j) \leq 1$ signaled to the UE over RRC;

$\Delta_{TF,c}(i)$ is an adjustment factor depending on the number of coded bits that is exactly specified in 3GPP TS 36.213; and $f_c(i)$ is the closed loop power control derived from what $\delta_{PUSCH}$ which is signaled to the UE in the uplink (UL) grant. Two methods exist today in LTE to calculate $f_c$, either accumulation based or not. If accumulation-based calculation is not activated, $f_c(i)$ follows directly the value of $\delta_{PUSCH}$ indicated in the UL grant. If accumulation-based calculation is activated, $f_c(i)$ is updated according to $\delta_{PUSCH}$ in the UL grant and its previous value $f_c(i-1)$ according to $f_c(i)=f_c(i-1)+\delta_{PUSCH,c}(i-K_{PUSCH})$, $K_{PUSCH}$ represents the delay between the UL grant and the UL data transmission (Tx).

The power control for sPUSCH has not been defined yet, but is likely to be based on the power control of PUSCH. Similar equation and parameters as listed above can be used.

Power Control for PUCCH and sPUCCH

Power control for Physical Uplink Control Channel (PUCCH) is defined in 3GPP TS 36.213 as, for subframe i and serving cell c, $$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}$$

for PUCCH format 1/1a/1b/2/2a/2b/3 and $$P_{PUCCH}(i) = \min \begin{Bmatrix} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{Bmatrix}$$

for PUCCH format 4/5,
where:
- $P_{CMAX,c}(i)$ is the maximum transmit power;
- $P_{O\_PUCCH}$ is the target of received power;
- $PL_c$ is the downlink path loss estimate;
- $h(n_{CQI}, n_{HARQ}, n_{SR})$ is a PUCCH format dependent value that reflects cases with larger payload;
- $M_{PUCCH,c}(i)$ is the number of RBs for PUCCH format 5, equals 1 for all other formats;
- $\Delta_{F\_PUCCH}(F)$ is a relation in dB between PUCCH format F and PUCCH format 1a;
- $\Delta_{TT,c}(i)$ is an adjustment factor depending on the number of coded bits that is exactly specified in 3GPP TS 36.213;
- $\Delta_{TxD}(F')$ depends on the number of antenna ports configured for PUCCH; and
- g(i) is the closed loop power control state and is updated using $\delta_{PUCCH}$ signalled in the DL assignment.

The power control for sPUCCH has not been defined yet, but is likely to be based on the power control of PUCCH. Similar equations and parameters as listed above can be used.

UL Power Prioritization Among UL Physical Channels of 1 ms TTI

For 1 ms UL TTI in LTE, if the UE has parallel transmission of two or more UL physical channels and does not have enough power for parallel transmission of all UL physical channels, the UL power is distributed among the uplink physical channels according to a priority of the 1 ms UL TTIs. However, the priority information for the 1 ms UL TTIs may not provide sufficient information for distributing UL power in some scenarios. For example, the priority of the UL TTIs does not provide information about how to distribute UL power for scenarios in which the parallel transmissions include one or more UL sTTIs.

SUMMARY

An object of certain embodiments includes improving distribution of UL power for scenarios in which a wireless device has parallel transmission of two or more UL physical channels and does not have enough power for parallel transmission of all UL physical channels. Certain embodiments improve distribution of UL power by providing rules for prioritizing sTTI transmissions. As an example, certain embodiments prioritize sTTI transmissions over TTI transmissions. As another example, certain embodiments prioritize sTTI transmissions comprising control information over sTTI transmissions without control information.

According to certain embodiments, a method is disclosed for use in a wireless device. The method comprises determining that the wireless device has scheduled parallel transmissions during a subframe. The parallel transmissions are scheduled on two or more uplink, UL, physical channels, and the parallel transmissions comprise one or more short transmission time interval, sTTI, transmissions. The method further comprises distributing UL power among the parallel transmissions. The UL power is distributed according to at least one of the following prioritization rules: (1) sTTI transmissions comprising control information are prioritized over sTTI transmissions comprising data without any control information; and/or (2) transmissions with shorter transmission time intervals are prioritized over transmissions with longer transmission time intervals.

According to certain embodiments, a wireless device comprises memory and processing circuitry. The memory is operable to store instructions, and the processing circuitry is operable to execute the instructions. By executing the instructions, the wireless device is operable to determine that the wireless device has scheduled parallel transmissions during a subframe. The parallel transmissions are scheduled on two or more uplink, UL, physical channels, and the parallel transmissions comprise one or more short transmission time interval, sTTI, transmissions. The wireless device is further operable to distribute UL power among the parallel transmissions. The UL power is distributed according to at least one of the following prioritization rules: (1) sTTI transmissions comprising control information are prioritized over sTTI transmissions comprising data without any control information; and/or (2) transmissions with shorter transmission time intervals are prioritized over transmissions with longer transmission time intervals.

According to certain embodiments, a computer program product comprising a non-transitory computer readable medium. The non-transitory computer readable medium stores computer readable program code. The computer readable program code comprises program code for determining that the wireless device has scheduled parallel transmissions during a subframe. The parallel transmissions are scheduled on two or more uplink, UL, physical channels, and the parallel transmissions comprise one or more short transmission time interval, sTTI, transmissions. The computer readable program code further comprises program code for distributing UL power among the parallel transmissions. The UL power is distributed according to at least one of the following prioritization rules: (1) sTTI transmissions comprising control information are prioritized over sTTI transmissions comprising data without any control information; and/or (2) transmissions with shorter transmission time intervals are prioritized over transmissions with longer transmission time intervals.

Certain embodiments of the above-described method, wireless device, and/or computer program product may include one or more of the following features:
- In certain embodiments, the method/wireless device/computer program product determines that the wireless device has a limited UL power for the parallel transmissions scheduled during the subframe.
- In certain embodiments, the prioritization rules for distributing UL power among the parallel transmissions comprise prioritizing the sTTI transmissions in the following order: (1) sTTI transmissions that use a control channel to transmit control information, (2) sTTI transmissions that use a data channel to transmit control information, and (3) sTTI transmissions that use the data channel to transmit data without any control information.
- In certain embodiments the method/wireless device/computer program product uses a common factor to scale the UL power for the sTTI transmissions that use the data channel to transmit data (rather than control information) based on determining that the UL power is not sufficient for the parallel transmissions.
- In certain embodiments, the parallel transmissions comprise one or more TTI transmissions, each having a duration of 1 ms (whereas each of the one or more sTTI transmissions has a duration of less than 1 ms). The prioritization rules for distributing the UL power among the parallel transmissions prioritize the one or more sTTI transmissions over the one or more TTI transmissions.

In certain embodiments, the parallel transmissions comprise one or more TTI transmissions configured according to Long Term Evolution, LTE, Release 8. The prioritization rules for distributing the UL power among the parallel transmissions prioritize the one or more sTTI transmissions over the one or more TTI transmissions, each sTTi transmission having a shorter duration than each TTI transmission.

In certain embodiments, distributing the UL power among the parallel transmissions comprises reserving a first amount of UL power for the one or more sTTI transmissions scheduled on the control channel. The first amount of UL power is reserved upon determining that one or more of the sTTI transmissions are scheduled on a control channel. A first amount of remaining UL power is calculated by deducting the reserved first amount of UL power from a total UL power allowed or available to the wireless device. A second amount of UL power is reserved from the first amount of remaining UL power for the one or more sTTI transmissions scheduled on the data channel and including the control information. The second amount of power is reserved upon determining that one or more of the sTTI transmissions are scheduled on a data channel and include the control information. A second amount of remaining UL power is calculated by deducting the reserved second amount of UL power from the calculated first amount of remaining UL power. A third amount of UL power is reserved from the second amount of remaining UL power for the one or more sTTI transmissions scheduled on the data channel and not including the control information. The third amount of UL power is reserved upon determining that one or more of the sTTI transmissions are scheduled on the data channel and do not include the control information.

In certain embodiments, the method/wireless device/computer program product transmits the parallel transmissions according to the determined distribution of UL power.

In certain embodiments, the transmissions with the shorter transmission time intervals are scheduled on a different carrier than the transmissions with the longer transmission time intervals.

In certain embodiments, the prioritization rules for distributing UL power prioritize sTTI transmissions that include control information over sTTI transmissions that do not include control information, and prioritize TTI transmissions that include control information over TTI transmissions that do not include control information. For example, the prioritization rules for distributing UL power may prioritize transmissions in the following order: (1) sTTI transmissions that include control information, (2) sTTI transmissions that do not include control information, (3) TTI transmissions that include control information, (4) TTI transmissions that do not include control information.

In certain embodiments, the one or more sTTI transmissions are scheduled only at the beginning of the subframe. In this case, distributing the UL power for the subframe may comprise distributing a first amount of UL power for the one or more sTTI transmissions, calculating a remaining UL power by deducting the first amount of UL power from a total UL power allowed or available to the wireless device, and distributing the remaining UL power for the TTI transmissions. In the example, the first amount of UL power (the UL power for the one or more sTTI transmission) satisfies the UL power needed for the one or more sTTI transmissions.

In certain embodiments, distributing the UL power for the subframe comprises determining all of the UL transmissions that have been scheduled for the subframe as of a pre-determined time (t0). The pre-determined time is based on an amount of time before the start of the subframe ($t_{start}-\Delta$). A first amount of UL power is distributed for the sTTI transmissions. The first amount of UL power satisfies the UL power needed for the one or more sTTI transmissions that have been scheduled for the subframe as of the pre-determined time (t0) is distributed for the sTTI transmissions. The remaining UL power is calculated by deducting the first amount of UL power from a total UL power allowed or available to the wireless device. The remaining UL power is distributed for the TTI transmissions. In certain embodiments, less UL power is distributed to the TTI transmissions for a portion of the subframe during which the sTTI transmissions have been scheduled, and more UL power is distributed to the TTI for a portion of the subframe during which the sTTI transmissions have not been scheduled.

In certain embodiments, each of the one or more sTTI transmissions is scheduled in the middle of the subframe.

In certain embodiments, it may be determined that at least one of the one or more sTTI transmissions in the subframe did not get scheduled until after the pre-determined time (t0). In that case, the UL power available for the TTI transmissions can be re-distributed during transmission of the sTTI(s) that did not get scheduled until after the pre-determined time (t0).

In certain embodiments, the length of the subframe is 1 ms. In certain embodiments, the one or more sTTI transmissions comprise a first sTTI transmission and a second sTTI transmission. The first and second sTTI transmissions each has a duration less than 1 millisecond, and the first sTTI has a shorter duration than the second sTTI. The prioritization rule for distributing UL power prioritizes the shorter sTTI (first sTTI) over the longer sTTI (second sTTI).

Certain embodiments of the present disclosure may provide one or more technical advantages. For example, certain embodiments may advantageously enable a UE to distribute its power with the most appropriate priority in case the UE has not enough power for all UL physical channels. Certain embodiments may prioritize UL power distribution to UL transmissions having an sTTI over UL transmissions having a TTI. An advantage of prioritizing UL power distribution to sTTIs may be to ensure sufficient UL power is allocated to minimize delays for sTTIs (which are typically less delay-tolerant than TTIs). Certain embodiments may prioritize UL power distribution to UL transmissions that include control information over UL transmissions that do not include control information. An advantage of prioritizing UL power distribution to control information may be to ensure sufficient UL power is allocated to minimize delays for control information (which may be important for optimal control). Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, for 1 ms UL TTI in LTE, if the UE has parallel transmission of two or more UL physical channels and does not have enough power for parallel transmission of all UL physical channels, the UL power is distributed among the uplink physical channels according to priority. For example, UL power may be distributed according to the following priority: (1) PUCCH first; (2) PUSCH with UCI (UL control Information); (3) PUSCH without UCI; (4) PRACH; and (5) SRS. Certain UEs can also support sTTI transmissions (an sTTI transmission has a duration less than 1 ms and is therefore shorter than a 1 ms TTI transmission). However, power control for physical channels on sTTI has not yet been defined. Hence, there is no current solution on how to control power on sPUSCH and sPUCCH, and more specifically how to prioritize power among UL physical channels used for sTTI and also between UL physical channels used for sTTI and 1 ms TTI.

The present disclosure contemplates various embodiments that may address these and other deficiencies. In certain embodiments, a methods to support UL power prioritization among UL channels for sTTI are disclosed. According to one example embodiment, UL power is prioritized among sTTI UL channels and between sTTI and 1 ms TTI UL channels. In addition, a method is disclosed to set the power for 1 ms UL TTI considering the sTTI scheduled for the overlapping subframe. The various embodiments described herein may advantageously enable a UE to distribute its power with the most appropriate priority in case the UE has not enough power for all UL physical channels. Other advantages may be readily apparent to one having skill in the art. Certain embodiments may have none, some, or all of the recited advantages.

Figure 1:
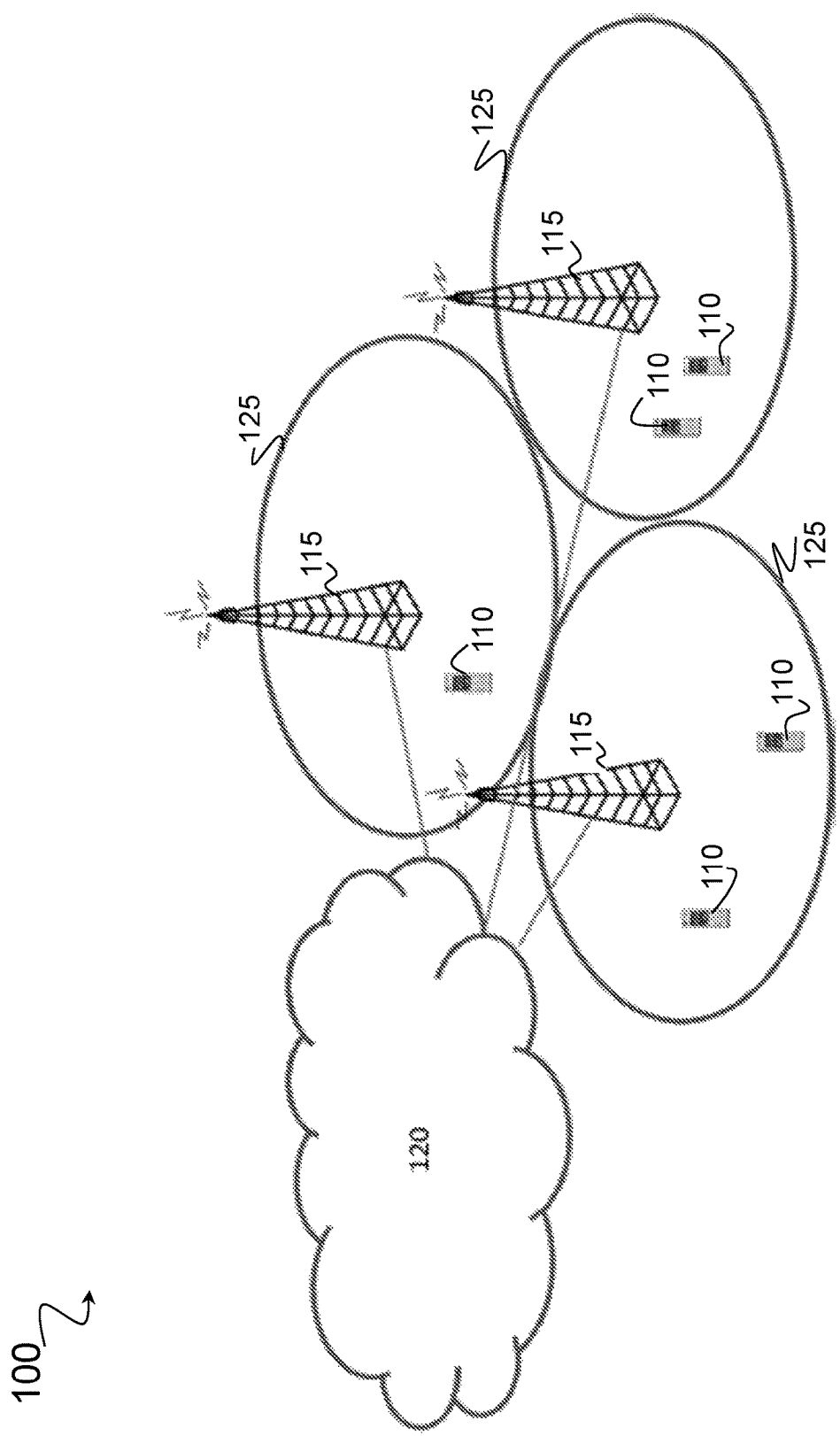
FIG. 1 is a schematic diagram of an exemplary wireless communications network, in accordance with certain embodiments.

FIG. 1 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 7-11.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Power Prioritization among UL Physical Channels of Short TTI

In certain embodiments, if a UE has parallel transmission of two or more UL physical channels of short TTI and does not have enough power for parallel transmission of all UL physical channels, the UL power is distributed among the uplink physical channels according to the following priority:
1. sPUCCH first
2. sPUSCH with UCI (UL control Information)
3. sPUSCH without UCI This enables to ensure that control-related information is prioritized over data.

In certain embodiments, a method in a UE is disclosed. According to one example embodiment, the method comprises the following actions:
1. The UE should first reserve power for sPUCCH if it has a sPUCCH transmission. The power reserved for a potential sPUCCH transmission follows the power control equation. An example is provided for PUCCH format 1/1a/1b/2/2a/2b/3:

$$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases}$$

Another example is provided for PUCCH format 4/5:

$$P_{PUCCH}(i) = \min \begin{cases} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{cases}$$

The remaining power is then computed by removing the power reserved for a potential sPUCCH from the total available or allowed Tx power of the UE.
2. From the remaining power after action 1, power is then reserved for sPUSCH with UCI in case there is such a transmission in the same sTTI. The power reserved for sPUSCH with UCI follows the power control equation where an example is provided as follows:

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases},$$

The remaining power is then computed by removing the power reserved for sPUSCH with UCI from the Tx power of the UE remaining after action 1.
3. The remaining power after action 2 is then dedicated to sPUSCH without UCI transmissions. First, the power needed for sPUSCH without UCI transmissions follows the power control equation where an example is provided as follows:

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases},$$

If more power is needed than what is left from action 2, the power is scaled with the same factor for all sPUSCH without UCI transmissions so that the remaining power after action 2 is not exceeded. Note that there can be parallel sPUSCH without UCI transmissions in multiple parallel frequency carriers. In that case, there is no reason to prioritize a sPUSCH without UCI transmission on a particular carrier compared to the sPUSCH without UCI transmissions on the other carriers. That's why the remaining power after action 2 is scaled in the same way among all parallel sPUSCH without UCI transmissions over different carriers.

Power Prioritization Between UL Physical Channels of Short TTI and 1 ms TTI

A UE can have received UL grants for overlapping or parallel short TTI UL transmission and 1 ms TTI UL transmission. This may happen on the same carrier or, more likely, this may happen on different carriers. In the latter case, a 1 ms TTI UL transmission is scheduled for UE 0 on carrier 0 and a sTTI UL transmission is scheduled in the same subframe for the same UE on carrier 1. If UE 0 is not power limited, the power for 1 ms UL TTI and the power for UL sTTI is calculated following the example equations described above. One consideration is how the power should be distributed if the UE is power limited.

Short TTI are used for time-critical services that would benefit from lower latency compared to 1 ms TTI. The general rule should thus be to prioritize sTTI over 1 ms TTI since that will to the furthest extent make sure that latency critical sTTI transmissions are carried out as soon as possible.

According to another example embodiment, if the UE is power limited, the following actions should be followed to distribute its power:

1. The UE should first calculate the power that is needed for the sTTI UL transmissions. Several UL sTTI transmissions can be conducted in parallel (e.g., sPUCCH and sPUSCH or sPUSCH with UCI and sPUSCH). The prioritization among those UL sTTI channels should follow the method described above with respect to power prioritization among UL physical channels of short TTI. After having distributed the power among sTTI channels, the UE calculates the remaining power.
2. Given the remaining power after action 1, the UE should distribute the power among 1 ms UL TTI channels according to the specified prioritization rules for 1 ms UL TTI physical channels described above.

The procedure described just above works well if sTTI transmissions are scheduled only at the beginning of a subframe. In this case, the 1 ms UL TTI transmission on carrier 0 starts at exactly the same time as the UL sTTI transmission on carrier 1. Because of this, the UE, which then has all information available before transmission starts, can compute the power for sTTI and for 1 ms TTI before starting the transmission and can avoid changing output power during the subframe. This is depicted in FIG. 2 on subframe n.

Figure 2:
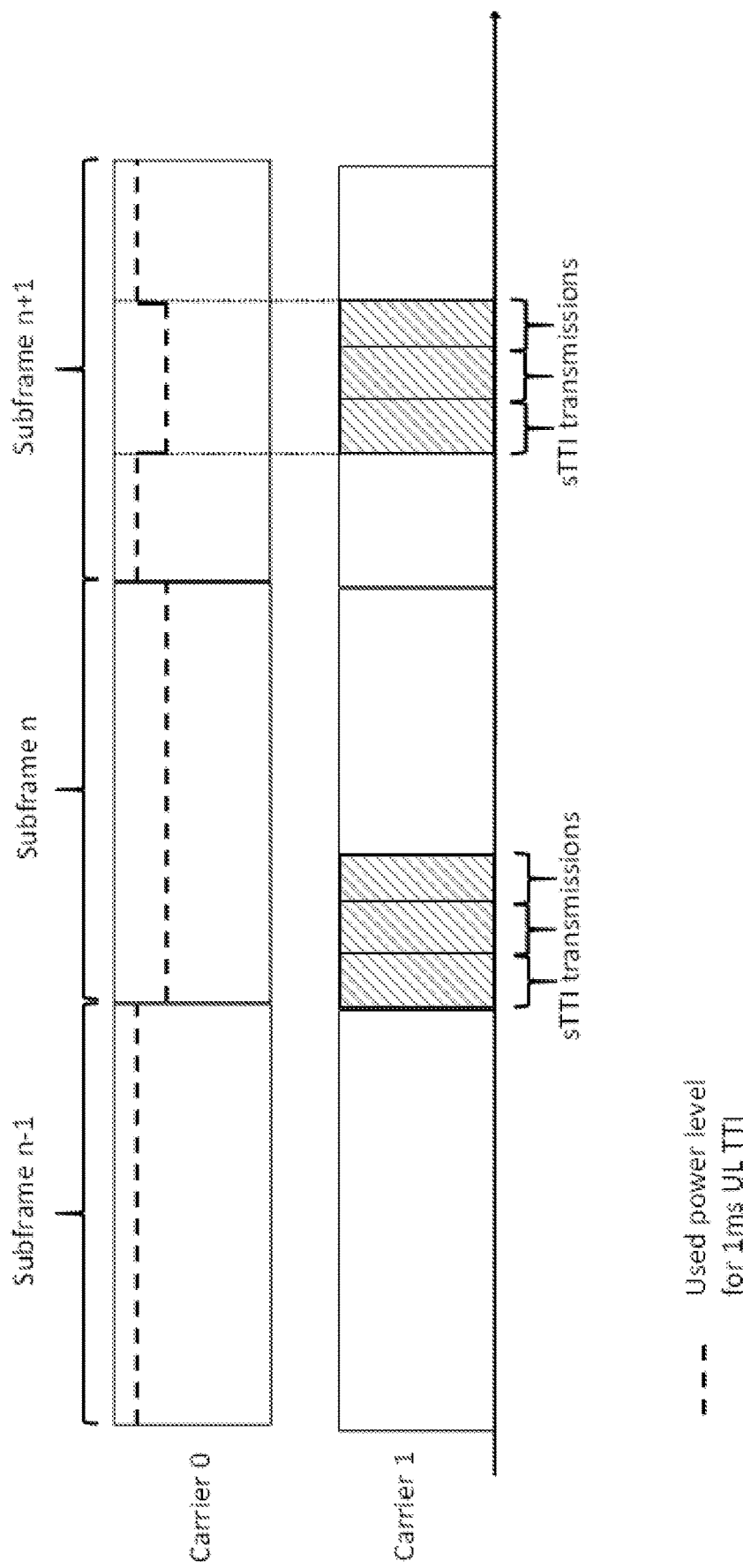
FIG. 2 illustrates an example of UL power level on 1 ms TTI carrier with potential parallel UL sTTI transmission in another carrier, in accordance with certain embodiments.

FIG. 2 illustrates an example of UL power level on 1 ms TTI carrier with potential parallel UL sTTI transmission in another carrier, in accordance with certain embodiments. Since the considered UE is power-limited, it can be seen that in subframe n−1 where there was only a 1 ms UL TTI transmission and no parallel UL sTTI transmission, the power level used for the 1 ms UL TTI transmission was higher than in subframe n that has parallel UL sTTI transmissions.

The situation becomes more complicated when the sTTI transmissions occur in the middle of a subframe as in the example depicted in FIG. 2 and subframe n+1. In that case, the 1 ms UL TTI started already at the subframe boundary with a given power and this power needs to be adjusted and lowered in the middle of the subframe due to sTTI transmissions. This may not be desirable.

According to another example embodiment, a method is disclosed that may advantageously enable the UE to avoid as much as possible large power adjustment in the middle of the subframe for 1 ms UL TTI in that case. Such an embodiment is described below with respect to FIGS. 3 and 4.

Figure 3:
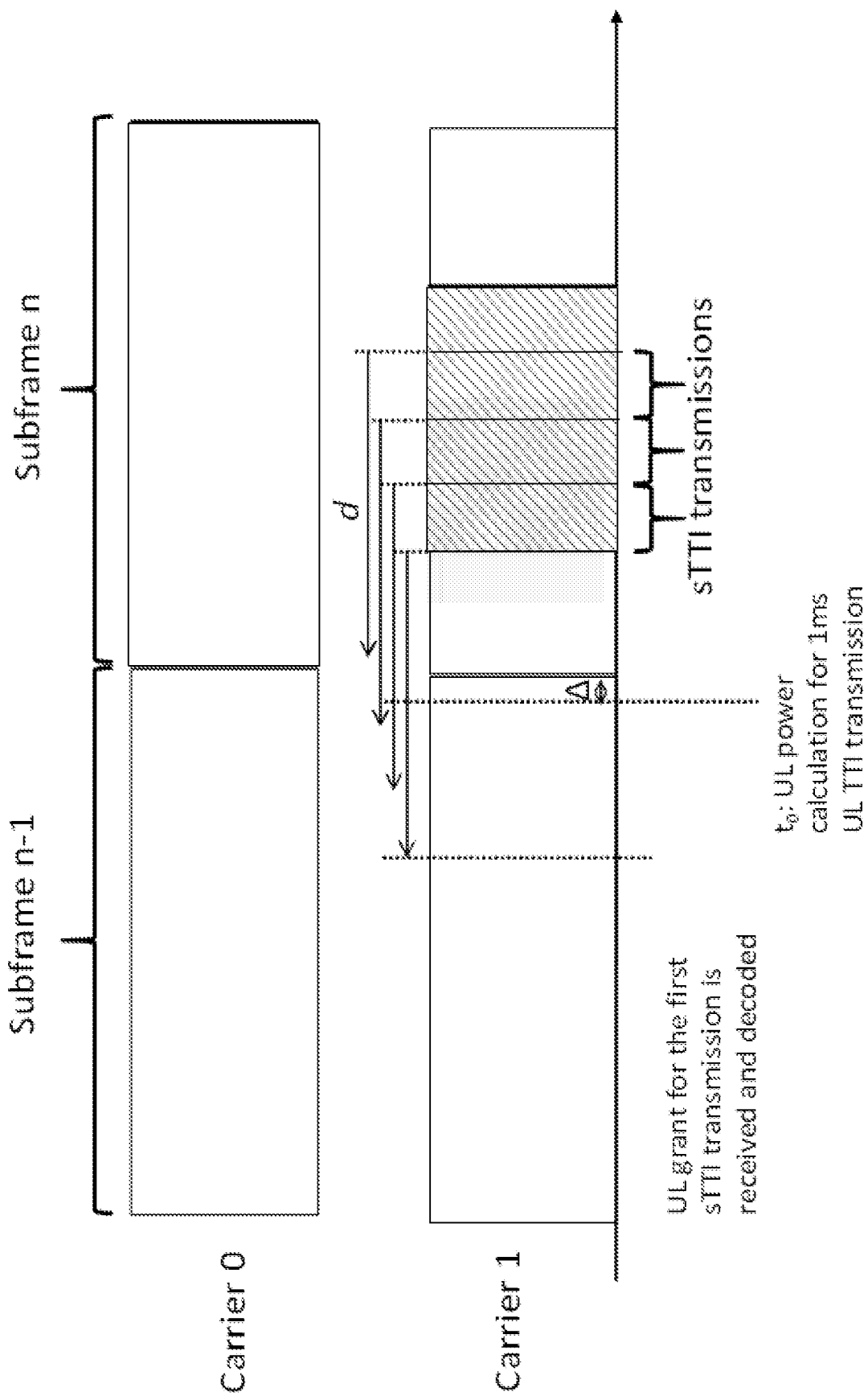
FIG. 3 illustrates an example of how to consider potential parallel UL sTTI transmission when setting UL power for 1 ms UL TTI, in accordance with certain embodiments.

FIG. 3 illustrates an example of how to consider potential parallel UL sTTI transmission when setting UL power for 1 ms UL TTI, in accordance with certain embodiments. In such an embodiment, the UE computes shortly before the subframe start the power needed for potential 1 ms UL TTI and sTTI transmissions. In this example, this happens at $t_0$=subframe start−$\Delta$. At this time, the UE should check all UL transmissions scheduled for the subframe n. This includes the 1 ms TTI UL transmissions and short TTI UL transmissions. In this additional embodiment, the UE sets the power for the 1 ms TTI transmissions considering all the short TTI UL transmissions that the UE is aware of at $t_0$. So, if the UE is power limited, the reduced power for the 1 ms UL TTI is used from the subframe start and not only when the sTTI are actually transmitted in the middle of the subframe as was the case in FIG. 2 described above. Since the delay d between the UL grant for short TTI transmission and the actual UL sTTI transmission, not all sTTI transmissions occuring in the following subframe are known to the UE at time $t_0$.

In FIG. 3, the last UL sTTI transmission is not known to the UE at time to. So, this means that there can be a variation of the power used for the 1 ms UL TTI during the subframe but it can be much smaller compared to not applying this embodiment.

Figure 4:
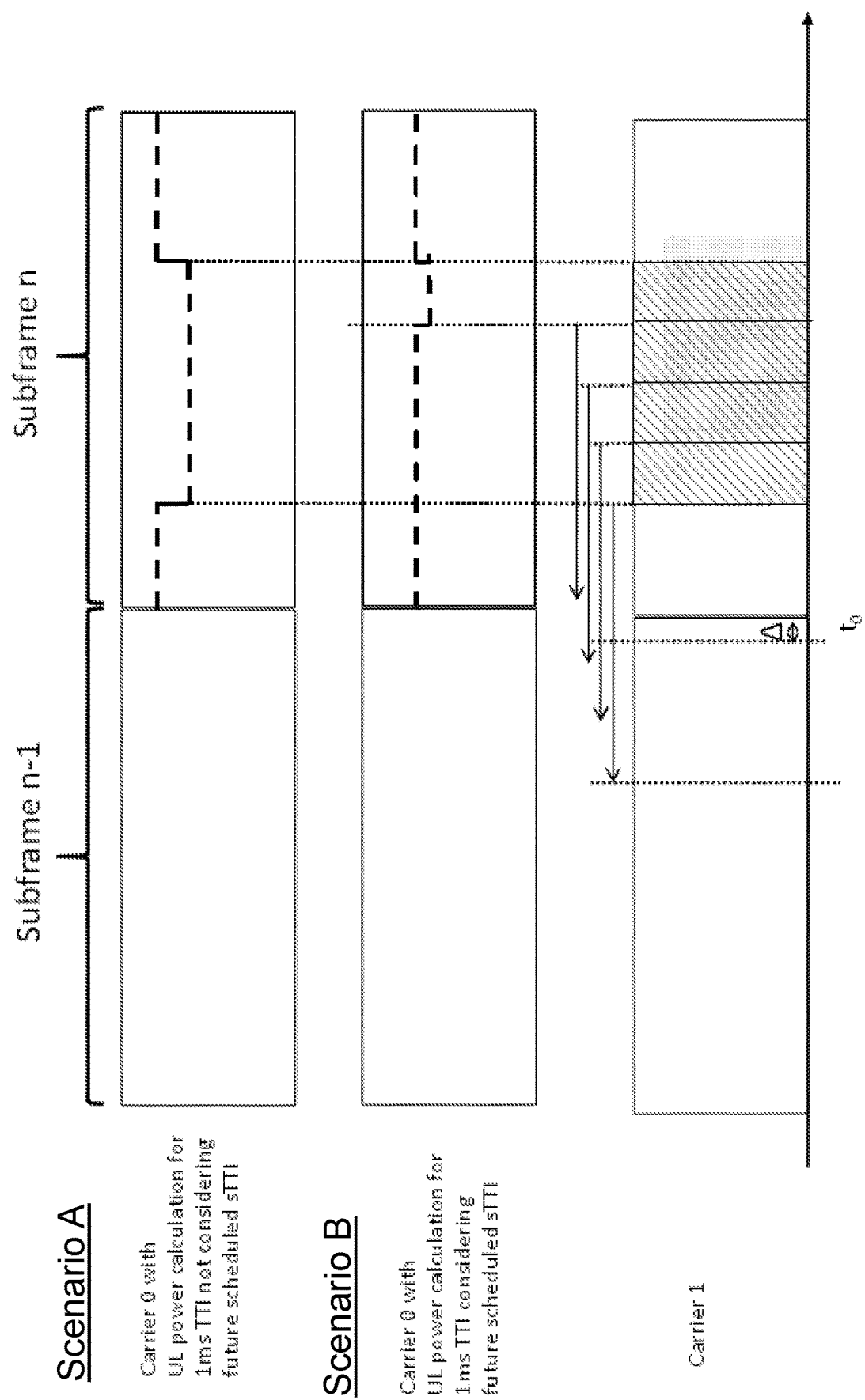
FIG. 4 illustrates a comparison of power level for 1 ms UL TTI when potential parallel UL sTTI transmissions are considered and when they are not considered, in accordance with certain embodiments.

FIG. 4 illustrates a comparison of power level for 1 ms UL TTI when potential parallel UL sTTI transmissions are considered and when they are not considered, in accordance with certain embodiments. FIG. 4 compares the power level for 1 ms TTI if the scheduled UL sTTI are considered for the overlapping subframe and when they are not considered. It can be seen from FIG. 4 that with the additional embodiment, the power of the 1 ms UL TTI is set to a lower value from the subframe start due to the UE power limitation and the consideration of scheduled sTTI in the same subframe. Due to a short delay d not all sTTI of the subframe are known to the UE at the time of setting the power for 1 ms UL TTI, therefore there is a power level change for 1 ms TTI in the middle of the subframe, but it is smaller than without considering the known scheduled sTTIs for the same subframe as shown in FIG. 4.

Figure 5:
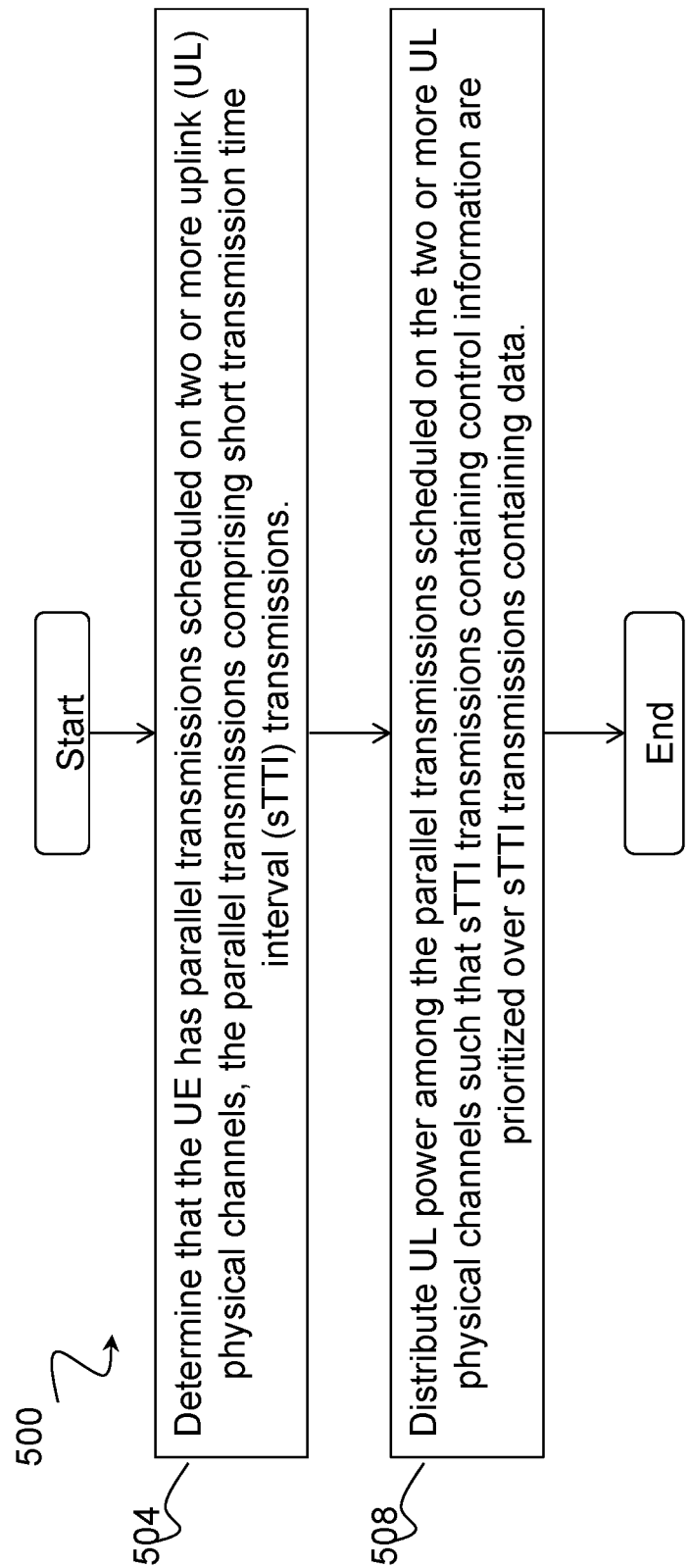
FIG. 5 is a flow diagram of a method in a user equipment, in accordance with certain embodiments.

FIG. 5 is a flow diagram of a method in a user equipment. The method begins at action 504, where the UE determines that the UE has parallel transmissions scheduled on two or more UL physical channels, the parallel transmissions comprising sTTI transmissions. At action 508, the UE distributes UL power among the parallel transmissions scheduled on the two or more UL physical channels such that sTTI transmissions containing control information are prioritized over sTTI transmissions containing data.

Figure 6:
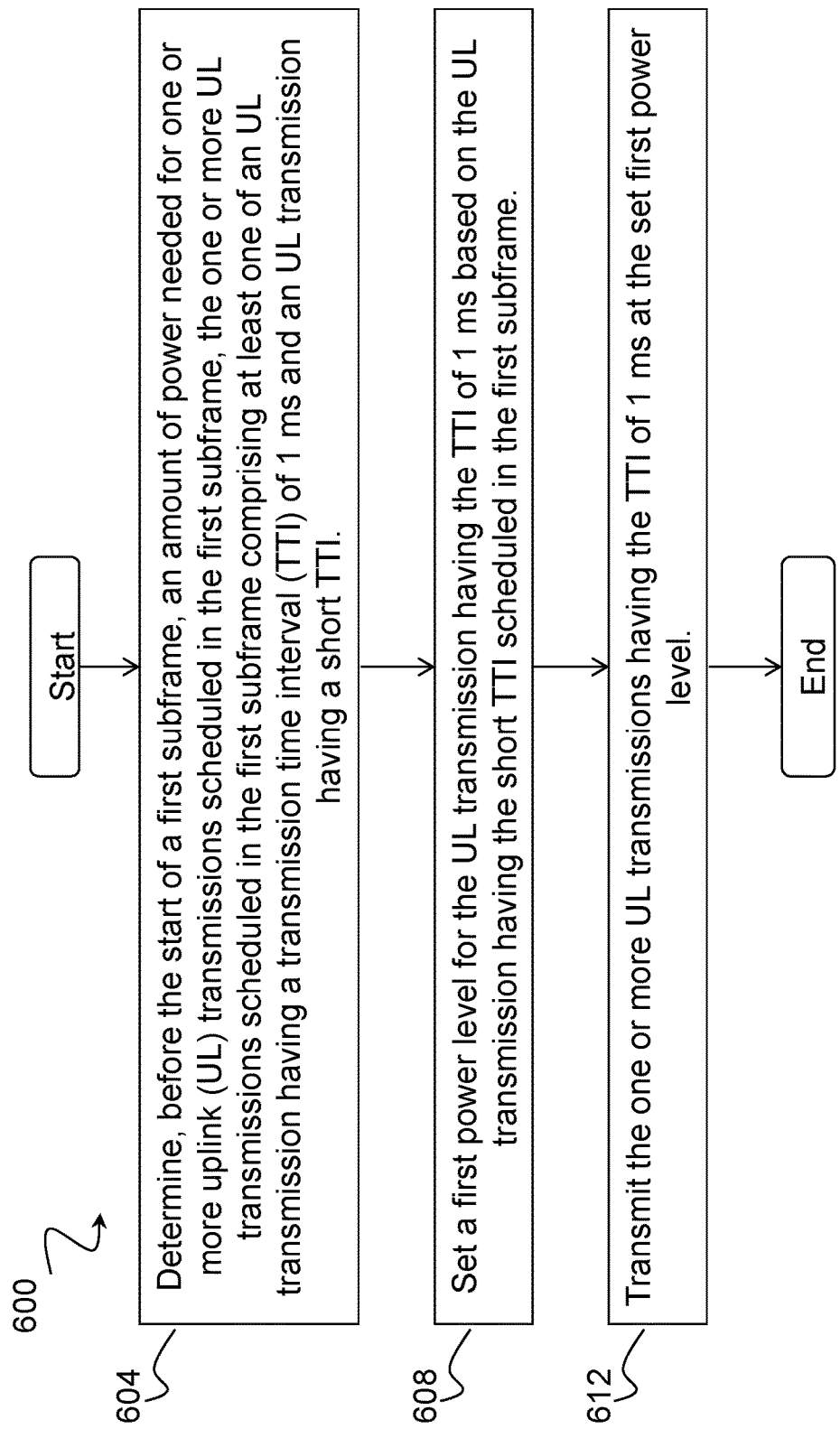
FIG. 6 is a flow diagram of a method in a user equipment, in accordance with certain embodiments.

FIG. 6 is a flow diagram of a method in a user equipment. The method begins at action 604, where the UE determines, before the start of a first subframe, an amount of power needed for one or more UL transmissions scheduled in the first subframe, the one or more UL transmissions scheduled in the first subframe comprising at least one of an UL transmission having a TTI of 1 ms and an UL transmission having a short TTI. At action 608, the UE sets a first power level for the UL transmission having the TTI of 1 ms based on the UL transmission having the short TTI scheduled in the first subframe. At action 612, the UE transmits the one or more UL transmissions having the TTI of 1 ms at the set first power level.

Figure 7:
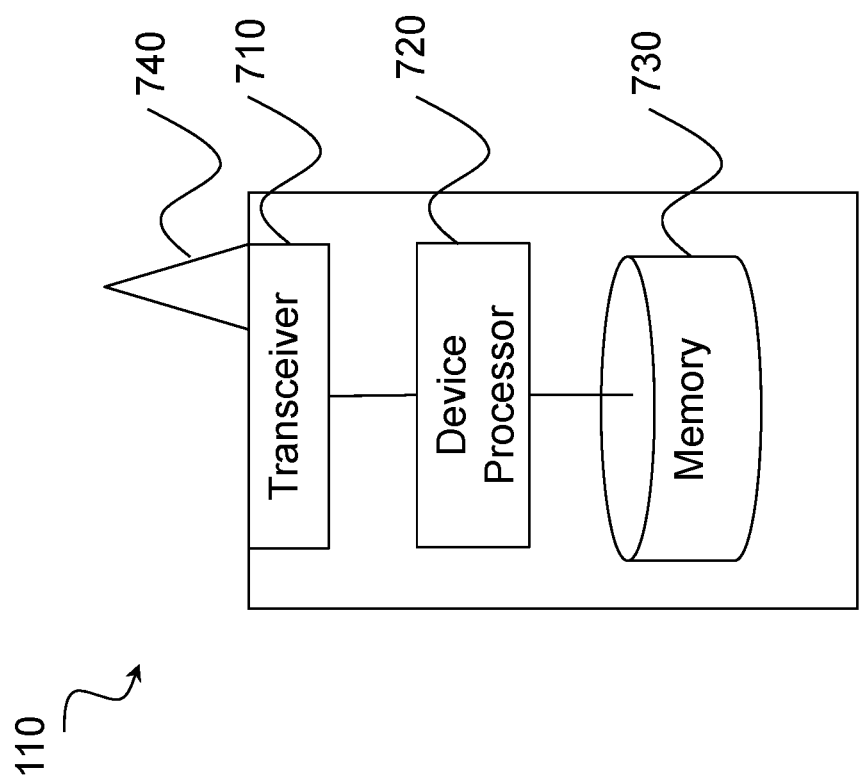
FIG. 7 is a block schematic of an exemplary wireless device, in accordance with certain embodiments.

FIG. 7 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processing circuitry 720, and memory 730. In some embodiments, transceiver 710 facilitates transmitting wireless signals to and receiving wireless signals from network node 115 (e.g., via antenna 740), processing circuitry 720 executes instructions to provide some or all of the functionality described above as being provided by wireless device 110, and memory 730 stores the instructions executed by processing circuitry 720.

Processing circuitry 720 may include any suitable combination of hardware and software implemented in one or more modules to execute instructions and manipulate data to perform some or all of the described functions of wireless device 110, such as the functions of wireless device 110 (e.g., UE) described in relation to FIGS. 1-6 and/or 12. For example, processing circuitry 720 may perform functions related to distributing UL power among parallel transmissions that include one or more sTTI transmissions. In some embodiments, processing circuitry 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 720.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
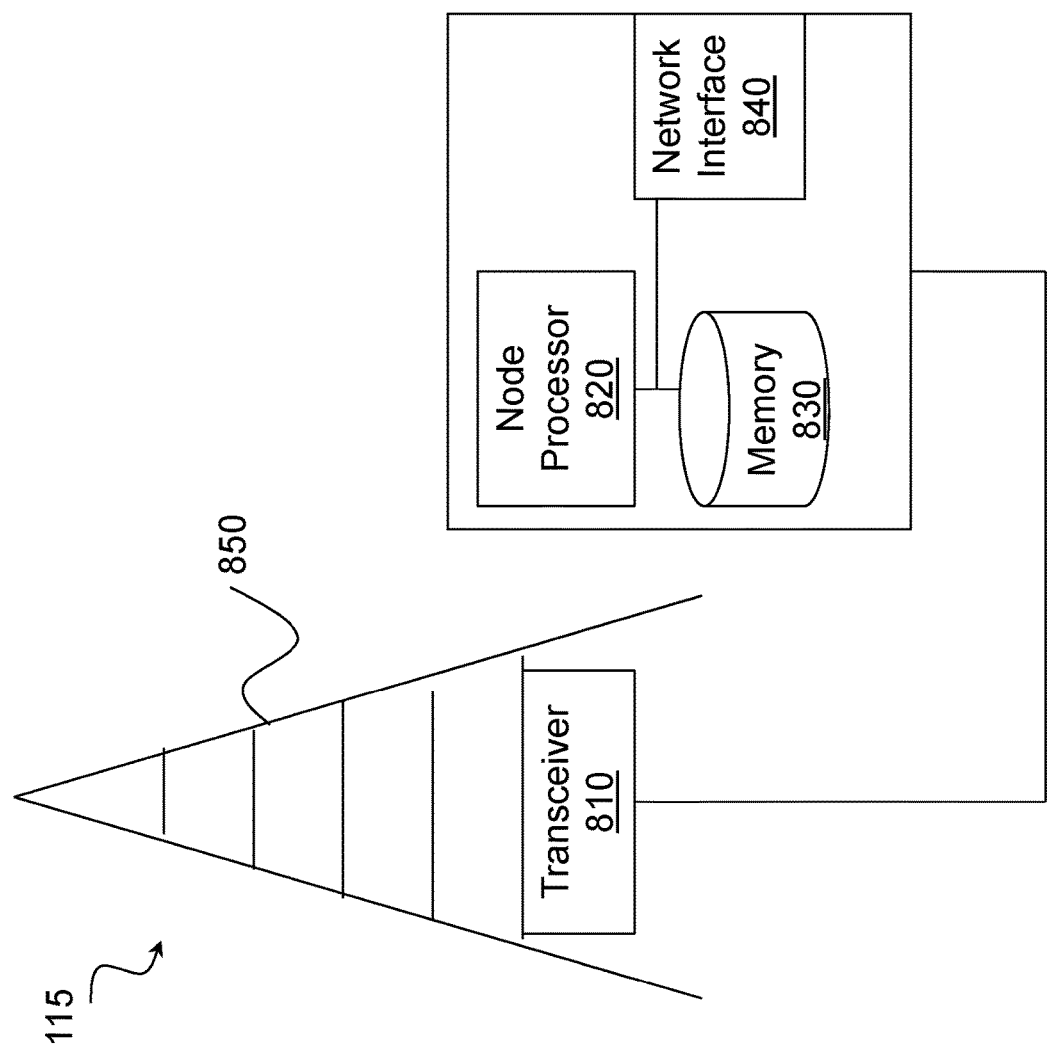
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processing circuitry 820, memory 830, and network interface 840. In some embodiments, transceiver 810 facilitates transmitting wireless signals to and receiving wireless signals from wireless device 110 (e.g., via antenna 950), processing circuitry 820 executes instructions to provide some or all of the functionality described above as being provided by a network node 115, memory 830 stores the instructions executed by processing circuitry 820, and network interface 840 communicates signals to backend network components, such as a gateway, switch, router, Internet, Public Switched Telephone Network (PSTN), core network nodes or radio network controllers 130, etc.

Processing circuitry 820 may include any suitable combination of hardware and software implemented in one or more modules to execute instructions and manipulate data to perform some or all of the described functions of network node 115, such as those described above in relation to FIGS. 1-6 above. In some embodiments, processing circuitry 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processing circuitry 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
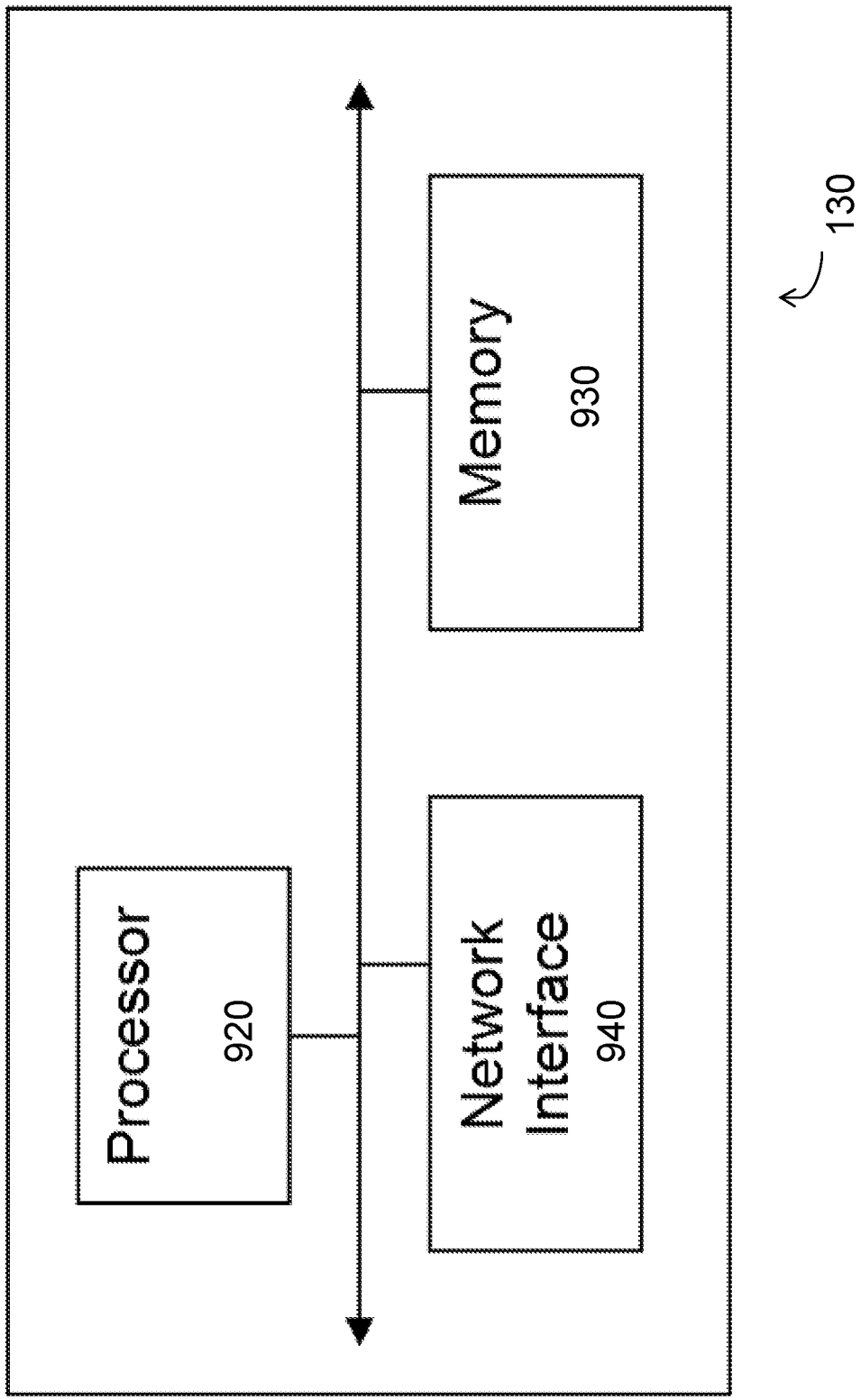
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 920, memory 930, and network interface 940. In some embodiments, processing circuitry 920 executes instructions to provide some or all of the functionality described above as being provided by the network node, memory 930 stores the instructions executed by processing circuitry 920, and network interface 940 communicates signals to any suitable node, such as a gateway, switch, router, Internet, Public Switched Telephone Network (PSTN), network nodes 115, radio network controllers or core network nodes 130, etc.

Processing circuitry 920 may include any suitable combination of hardware and software implemented in one or more modules to execute instructions and manipulate data to perform some or all of the described functions of the radio network controller or core network node 130. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
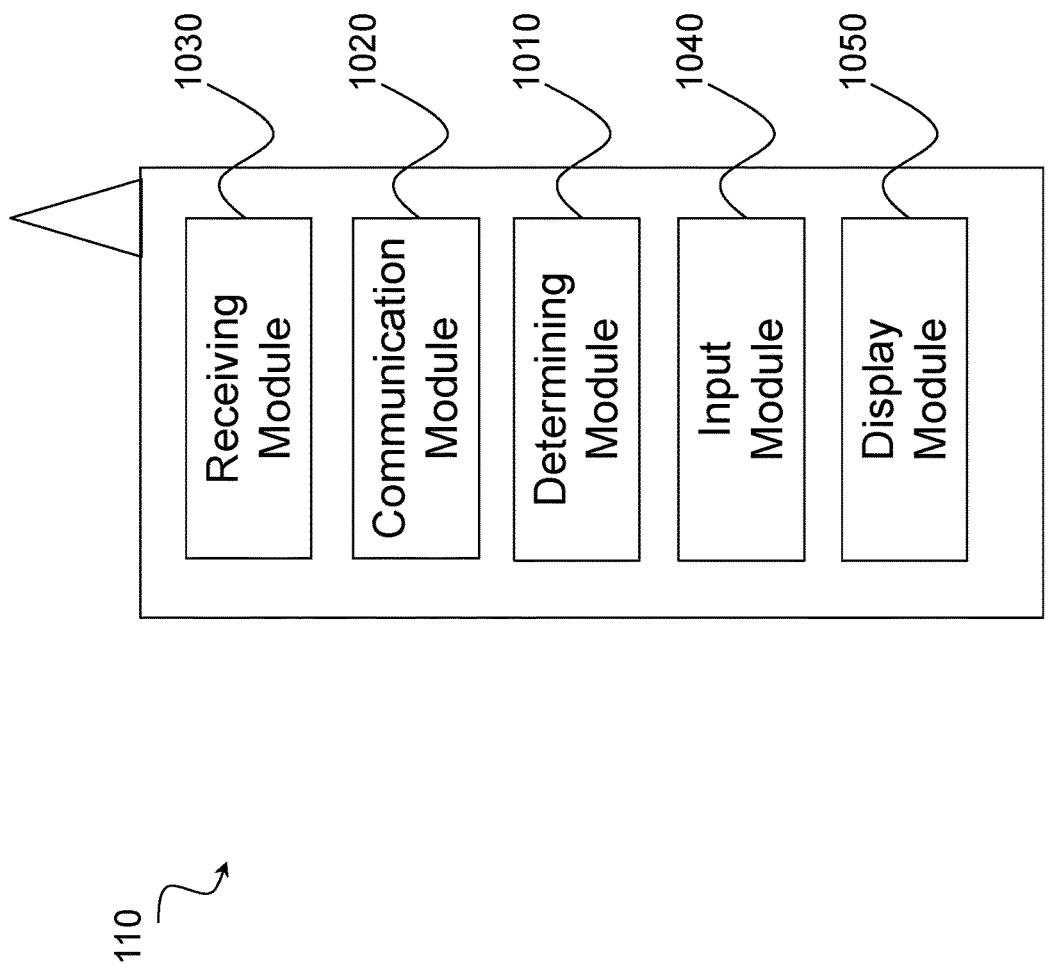
FIG. 10 is a block schematic of an exemplary wireless device, in accordance with certain embodiments.

FIG. 10 is a block schematic of an exemplary wireless device, in accordance with certain embodiments. Wireless device 110 may include one or more modules. For example, wireless device 110 may include a determining module 1010, a communication module 1020, a receiving module 1030, an input module 1040, a display module 1050, and any other suitable modules. Wireless device 110 may perform the methods for uplink power prioritization for short TTI described with respect to FIGS. 1-6 and/or 12.

Determining module 1010 may perform the processing functions of wireless device 110. For example, determining module 1010 may determine that the UE has parallel transmissions scheduled on two or more UL physical channels, the parallel transmissions comprising sTTI transmissions. As another example, determining module 1010 may distribute UL power among the parallel transmissions scheduled on the two or more UL physical channels such that sTTI transmissions containing control information are prioritized over sTTI transmissions containing data. As still another example, determining module 1010 may determine, before the start of a first subframe, an amount of power needed for one or more UL transmissions scheduled in the first subframe, the one or more UL transmissions scheduled in the first subframe comprising at least one of an UL transmission having a TTI of 1 ms and an UL transmission having a short TTI. As yet another example, determining module 1010 may set a first power level for the UL transmission having the TTI of 1 ms based on the UL transmission having the short TTI scheduled in the first subframe. Determining module 1010 may include or be included in one or more processors, such as processing circuitry 720 described above in relation to FIG. 7. Determining module 1010 may include analog and/or digital circuitry configured to perform any of the functions of determining module 1010 and/or processing circuitry 720 described above. The functions of determining module 1010 described above may, in certain embodiments, be performed in one or more distinct modules.

Communication module 1020 may perform the transmission functions of wireless device 110. As one example, communication module 1020 may transmit the one or more UL transmissions having the TTI of 1 ms at the set first power level. Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of wireless device 110. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

Figure 11:
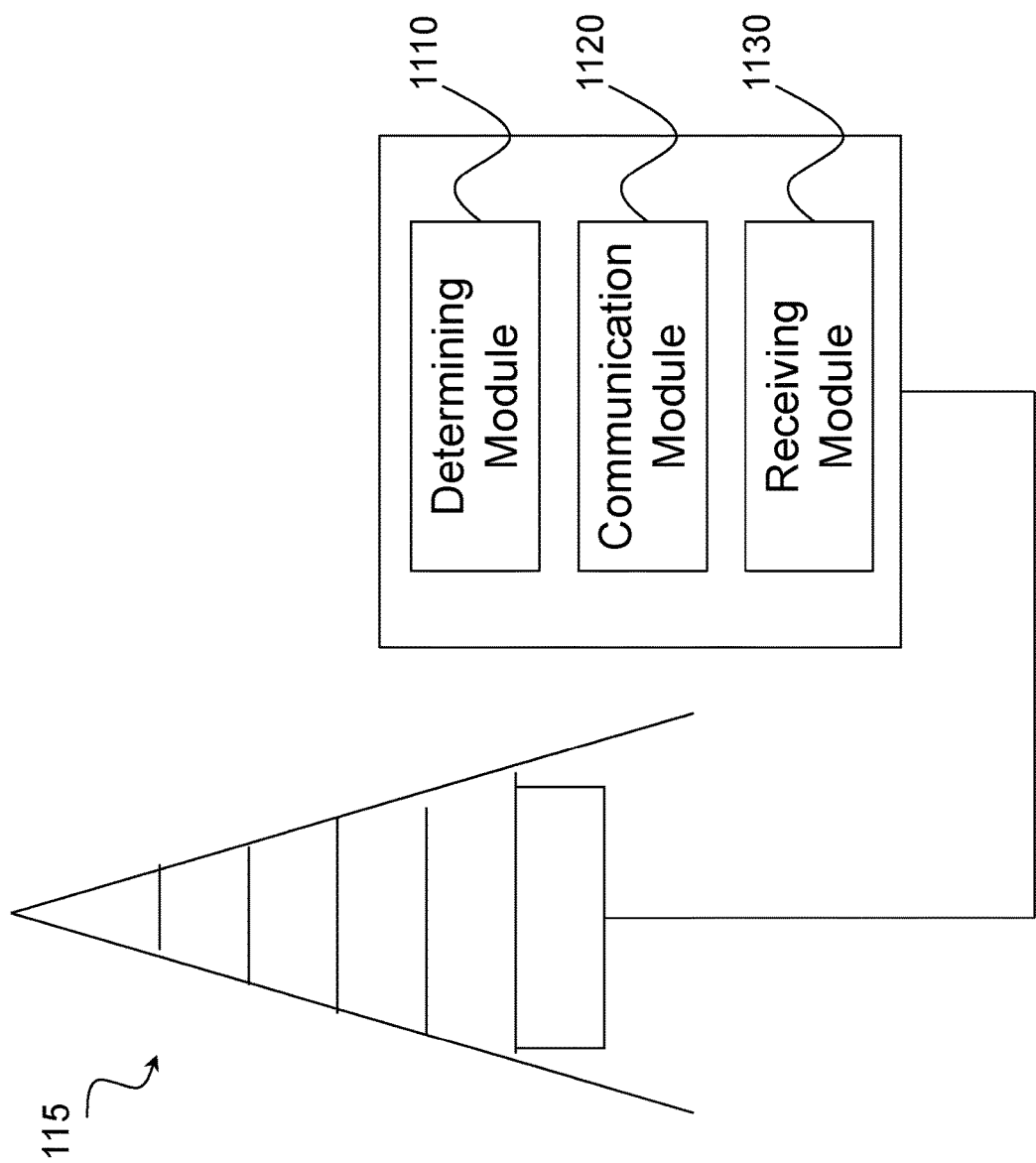
FIG. 11 is a block schematic of an exemplary network node, in accordance with certain embodiments.

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processing circuitry 820 described above in relation to FIG. 8. In certain embodiments, the functions of two or more of the various modules may be combined into a single module. Network node 115 may perform the methods for effective MIB acquisition for MTC devices described above with respect to FIGS. 1-6.

Determining module 1110 may perform the processing functions of network node 115. Determining module 1110 may include or be included in one or more processors, such as processing circuitry 820 described above in relation to FIG. 8. Determining module 1110 may include analog and/or digital circuitry configured to perform any of the functions of determining module 1110 and/or processing circuitry 820 described above. The functions of determining module 1110 may, in certain embodiments, be performed in one or more distinct modules. For example, in certain embodiments some of the functionality of determining module 1110 may be performed by an allocation module.

Communication module 1120 may perform the transmission functions of network node 115. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. Receiving module 1130 may receive any suitable information from a wireless device. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Figure 12:
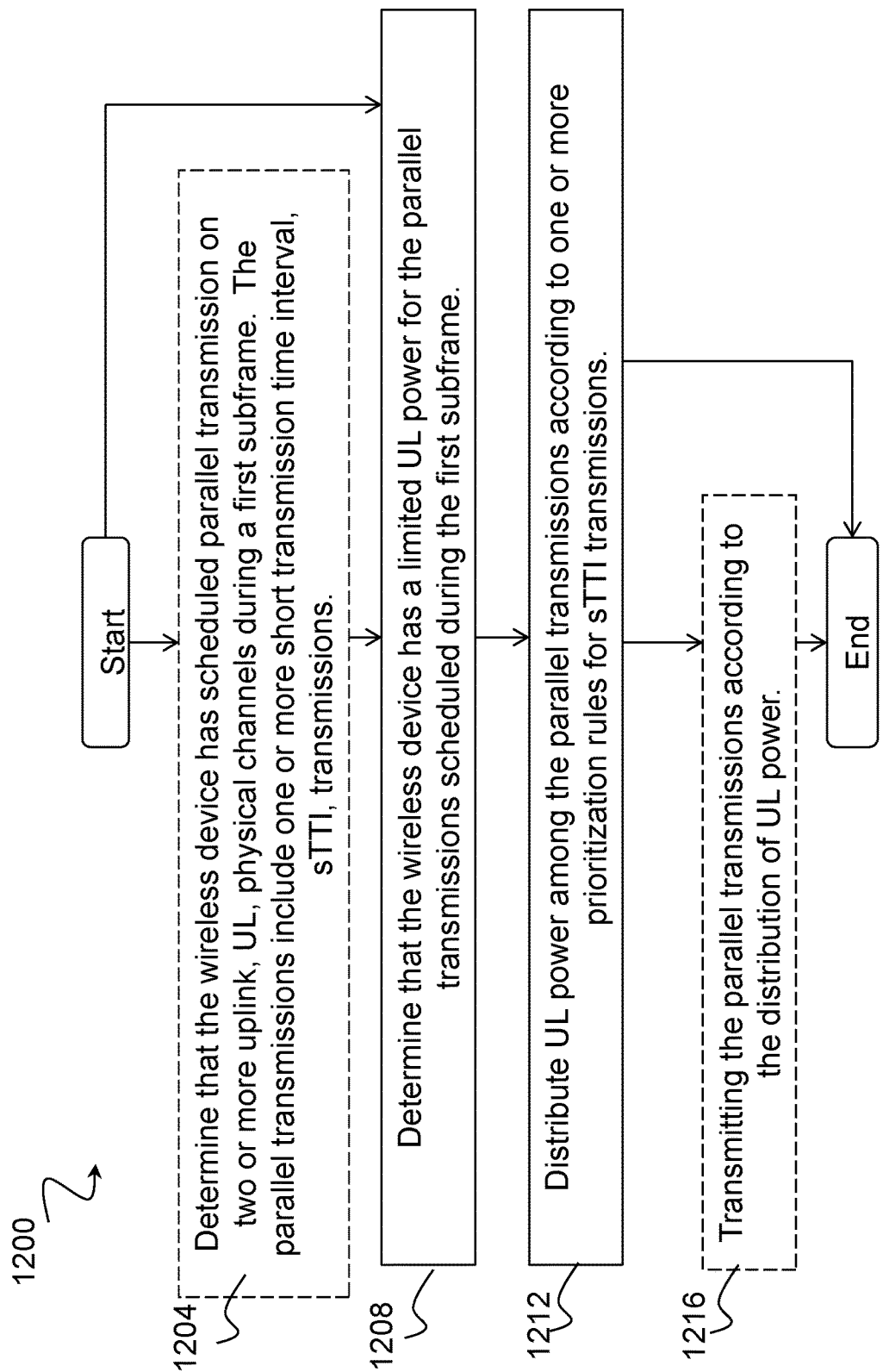
FIG. 12 is a flow diagram of a method in a wireless device, in accordance with certain embodiments.

FIG. 12 is a flow diagram of a method for use in a wireless device 110, in accordance with certain embodiments. At action 1204, the method determines that the wireless device 110 has scheduled parallel transmissions during a subframe (such as a 1 ms subframe described in LTE Release 8). The parallel transmissions are scheduled on two or more uplink, UL, physical channels, and the parallel transmissions comprise one or more sTTI transmissions. FIGS. 2, 3, and 4 illustrate examples in which the wireless device 110 has scheduled parallel transmissions on a first UL physical channel (e.g., the channel on carrier 0) and a second UL physical channel (e.g., the channel on carrier 1), and the parallel transmissions in subframe (n) include sTTI transmissions. The embodiments in FIGS. 2-4 show transmissions with the shorter transmission time intervals scheduled on a different carrier (carrier 1) than the transmissions with the longer transmission time intervals (carrier 0).

At action 1208, the method determines whether the wireless device 110 has a limited amount of UL power for the parallel transmissions scheduled during the subframe. In response to determining that wireless device 110 is not power-limited during the subframe, the method may perform UL power allocation without having to prioritize the allocation of UL power among the parallel transmissions. Alternatively, in response to determining that wireless device 110 is power-limited during the subframe, the method proceeds to action 1212 to distribute UL power according to prioritization rules for parallel transmission scenarios that include sTTI transmissions.

At action 1212, the method distributes UL power among the parallel transmissions. The UL power is distributed according to one or more prioritization rules. In certain embodiments, one of the prioritization rules may prioritize sTTI transmissions comprising control information over sTTI transmissions comprising data without any control information. Examples of methods that prioritize sTTI transmissions comprising control information over sTTI transmissions comprising data without any control information are discussed above with respect to power prioritization among UL physical channels of short TTI and FIG. 5. In certain embodiments, the prioritization rules for distributing UL power among the parallel transmissions comprise prioritizing the sTTI transmissions in the following order: (1) sTTI transmissions that use a control channel to transmit control information (such as sPUCCH), (2) sTTI transmissions that use a data channel to transmit control information (such as sPUSCH with UCI), and (3) sTTI transmissions that use the data channel to transmit data without any control information (such as sPUSCH without UCI).

In certain embodiments, one of the prioritization rules may prioritize transmissions with shorter transmission time intervals over transmissions with longer transmission time intervals. Examples of methods that prioritize transmissions with shorter transmission time intervals over transmissions with longer transmission time intervals are discussed above with respect to power prioritization between UL physical channels of short TTI and 1 ms TTI and FIG. 6, and certain examples can be summarized as follows:

- In certain embodiments, the parallel transmissions comprise both TTI and sTTI transmissions. Each TTI transmission has a duration of 1 ms, and each sTTI transmission has a duration of less than 1 ms. The prioritization rules for distributing the UL power among the parallel transmissions prioritize the sTTI transmission(s) over the TTI transmission(s).
- In certain embodiments, each TTI transmission can be configured according to Long Term Evolution, LTE, Release 8 (e.g., 14 symbols in the case of normal CP or 12 symbols in the case of extended CP), each sTTi transmission can have a shorter duration than each TTI transmission (e.g., 2 symbols, 7 symbols, or other suitable value less than TTI), and the prioritization rules for distributing the UL power among the parallel transmissions prioritize the one or more sTTI transmissions over the one or more TTI transmissions.
- In certain embodiments, the parallel transmissions comprise sTTI transmissions having different durations, such as a first sTTI transmission comprising 2 symbols and a second sTTI transmission comprising 7 symbols. Thus, the first sTTI has a shorter duration than the second sTTI. The prioritization rule for distributing UL power prioritizes the shorter sTTI (first sTTI having 2 symbols) over the longer sTTI (second sTTI having 7 symbols).
- In certain embodiments, the prioritization rules can combine rules that prioritize distribution of UL power based on content of the transmission (e.g., prioritizing transmissions with control information over transmissions without control information) with rules that prioritize distribution of UL power based on duration of the transmission (e.g., prioritizing shorter transmissions over longer transmissions). For example, the prioritization rules for distributing UL power may prioritize transmissions in the following order: (1) sTTI transmissions that include control information, (2) sTTI transmissions that do not include control information, (3) TTI transmissions that include control information, (4) TTI transmissions that do not include control information.

At action 1216, the method transmits the parallel transmissions according to the distribution of UL power determined in action 1212. The method then ends.

The prioritization rules for distributing UL power discussed with respect to FIG. 12 can calculate the UL power in any suitable manner. For example, as discussed above, one of the prioritization rules prioritizes transmissions in the following order: (1) sTTI transmissions that use a control channel to transmit control information (such as sPUCCH), (2) sTTI transmissions that use a data channel to transmit control information (such as sPUSCH with UCI), and (3) sTTI transmissions that use the data channel to transmit data without any control information (such as sPUSCH without UCI). In certain embodiments, calculating the UL power based on this rule may comprise the following actions:

- Reserve a first amount of UL power for the one or more sTTI transmissions scheduled on the control channel.
- Calculate a first amount of remaining UL power by deducting the reserved first amount of UL power from a total UL power allowed or available to the wireless device.
- Reserve a second amount of UL power from the first amount of remaining UL power, the second amount of UL power reserved for the one or more sTTI transmissions scheduled on the data channel and including the control information.
- Calculate a second amount of remaining UL power by deducting the reserved second amount of UL power from the calculated first amount of remaining UL power.
- Reserve a third amount of UL power from the second amount of remaining UL power, the third amount of UL power reserved for the one or more sTTI transmissions scheduled on the data channel and not including the control information.

Additionally, certain embodiments use a common factor to scale the UL power for the sTTI transmissions that use the data channel to transmit data (such as the sPUSCH without UCI) based on determining that the UL power is not sufficient for the parallel transmissions.

As another example, one of the prioritization rules discussed above prioritizes sTTI transmissions over TTI transmissions. In certain embodiments, calculating the UL power based on this rule may comprise determining that the one or more sTTI transmissions are scheduled only at the beginning of the subframe. In this case, distributing the UL power for the subframe may comprise distributing a first amount of UL power for the one or more sTTI transmissions, calculating a remaining UL power by deducting the first amount of UL power from a total UL power allowed or available to the wireless device, and distributing the remaining UL power for the TTI transmissions. In the example, the first amount of UL power (the UL power for the one or more sTTI transmission) satisfies the UL power needed for the one or more sTTI transmissions. FIG. 2 illustrates an example of distributing UL power to sTTI transmissions when the sTTI subframes are scheduled only at the beginning of the subframe (see subframe n of FIG. 2).

In certain embodiments, each of the one or more sTTI transmissions is scheduled in the middle of the subframe. As discussed above with respect to FIGS. 3-4, in certain embodiments, distributing the UL power for the subframe comprises determining all of the UL transmissions that have been scheduled for the subframe as of a pre-determined time (t0). The pre-determined time is based on an amount of time before the start of the subframe ($t_{start}$-$\Delta$). A first amount of UL power is distributed for the sTTI transmissions. The first amount of UL power satisfies the UL power needed for the one or more sTTI transmissions that have been scheduled for the subframe as of the pre-determined time (t0) is distributed for the sTTI transmissions. The remaining UL power is calculated by deducting the first amount of UL power from a total UL power allowed or available to the wireless device. The remaining UL power is distributed for the TTI transmissions.

In certain embodiments, it may be determined that at least one of the one or more sTTI transmissions in the subframe did not get scheduled until after the pre-determined time (t0). In that case, the UL power available for the TTI transmissions can be re-distributed during transmission of the sTTI(s) that did not get scheduled until after the pre-determined time (t0). An example is shown in FIG. 4, scenario B, wherein during the time that the fourth sTTI is transmitted on carrier 1, the UL power for the TTI on carrier 0 is reduced (in scenario B, UL power calculation for 1 ms TTI considers future scheduled sTTI).

In certain embodiments, less UL power is distributed to the TTI transmissions for a portion of the subframe during which the sTTI transmissions have been scheduled, and more UL power is distributed to the TTI for a portion of the subframe during which the sTTI transmissions have not been scheduled. Examples are shown in FIG. 2 (carrier 0, subframe n+1) and FIG. 4 (carrier 0, subframe n).

Summary of Example Embodiments

According to one example embodiment, a method in a user equipment is disclosed. The method comprises determining that the UE has parallel transmissions scheduled on two or more uplink (UL) physical channels, the parallel transmissions comprising short transmission time interval (sTTI) transmissions. The method comprises distributing UL power among the parallel transmissions scheduled on the two or more UL physical channels such that sTTI transmissions containing control information are prioritized over sTTI transmissions containing data. In certain embodiments, one or more of the following may apply:
- the method may comprise determining that the UE has limited UL power for the parallel transmissions scheduled on the two or more UL physical channels;
- distributing UL power among the parallel transmissions scheduled on the two or more UL physical channels such that sTTI transmissions containing control information are prioritized over sTTI transmissions containing data may comprise:
  - determining whether the UE has one or more UL transmissions scheduled on a control channel;
  - upon determining that the UE has one or more UL transmissions scheduled on a control channel, reserving a first amount of UL power for the one or more UL transmissions scheduled on the control channel;
  - calculating a first amount of remaining UL power by deducting the reserved first amount of UL power from a total available or total allowed UL power of the UE;
  - determining whether the UE has one or more UL transmissions scheduled on a data channel that include UL control information;
  - upon determining that the UE has one or more UL transmissions scheduled on a data channel that include UL control information, reserving a second amount of UL power from the first amount of remaining UL power for the one or more UL transmissions scheduled on the data channel that include UL control information;
  - calculating a second amount of remaining UL power by deducting the reserved second amount of UL power from the calculated first amount of remaining UL power;
  - determining whether the UE has one or more UL transmissions scheduled on a data channel that do not include UL control information; and
  - upon determining that the UE has one or more UL transmissions scheduled on the data channel that do not include UL control information, dedicating the second amount of remaining power to the one or more UL transmissions scheduled on the data channel that do not include UL control information;
- the method may comprise:
  - determining that the UL power as distributed is not sufficient for the parallel transmissions scheduled on the two or more UL physical channels; and
  - scaling the distributed power for the parallel transmissions using a common factor; and
- the parallel transmissions may further comprise one or more 1 ms TTI UL transmissions, and the method may comprise:
  - calculating an amount of UL power remaining after distributing UL power among the parallel transmissions scheduled on the two or more UL physical channels such that sTTI transmissions containing control information are prioritized over sTTI transmissions containing data; and
  - distributing the amount of UL power remaining such that 1 ms TTI transmissions containing control information are prioritized over 1 ms TTI transmissions that do not contain control information.

According to another example embodiment, a user equipment is disclosed. The user equipment comprises one or more processors. The one or more processors are configured to determine that the UE has parallel transmissions scheduled on two or more uplink (UL) physical channels, the parallel transmissions comprising short transmission time interval (sTTI) transmissions. The one or more processors are configured to distribute UL power among the parallel transmissions scheduled on the two or more UL physical channels such that sTTI transmissions containing control information are prioritized over sTTI transmissions containing data.

According to another example embodiment, a method in a user equipment is disclosed. The method comprises determining, before the start of a first subframe, an amount of power needed for one or more uplink (UL) transmissions scheduled in the first subframe, the one or more UL transmissions scheduled in the first subframe comprising at least one of an UL transmission having a transmission time interval (TTI) of 1 ms and an UL transmission having a short TTI. The method comprises setting a first power level for the UL transmission having the TTI of 1 ms based on the UL transmission having the short TTI scheduled in the first subframe. The method comprises transmitting the one or more UL transmissions having the TTI of 1 ms at the set first power level. In certain embodiments, one or more of the following may apply:
- the method may comprise determining all UL transmissions scheduled in the first subframe; and
- the method may comprise determining that the UE has limited UL power for the parallel transmissions scheduled on the two or more UL physical channels.

According to another example embodiment, a user equipment is disclosed. The user equipment comprises one or more processors. The one or more processors are configured to determine, before the start of a first subframe, an amount of power needed for one or more uplink (UL) transmissions scheduled in the first subframe, the one or more UL transmissions scheduled in the first subframe comprising at least one of an UL transmission having a transmission time interval (TTI) of 1 ms and an UL transmission having a short TTI. The one or more processors are configured to set a first power level for the UL transmission having the TTI of 1 ms based on the UL transmission having the short TTI scheduled in the first subframe. The one or more processors are configured to transmit the one or more UL transmissions having the TTI of 1 ms at the set first power level.

Certain embodiments of the present disclosure may provide one or more technical advantages. For example, certain embodiments may advantageously enable a UE to distribute its power with the most appropriate priority in case the UE has not enough power for all UL physical channels. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other actions. Additionally, actions may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the Preceding Description include:
AP Access Point
BLER Block Error Rate
BS Base Station
BSC Base Station Controller
BTS Base Transceiver Station
CDM Code Division Multiplexing
CPE Customer Premises Equipment
D2D Device-to-device
DAS Distributed Antenna System
DCI Downlink Control Information
DFT Discrete Fourier Transform
DL Downlink
eNB evolved Node B
ePDCCH Enhanced Physical Downlink Control Channel
FDD Frequency Division Duplex
LAN Local Area Network
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation and Coding scheme
MSR Multi-standard Radio
NAS Non-Access Stratum
OFDM Orthogonal Frequency Division Multiplexing
OFDMA Orthogonal Frequency Division Multiple Access
PDCCH Physical Downlink Control Channel
PDSCH Physical Downlink Shared Channel
PRB Physical Resource Block
PSTN Public Switched Telephone Network
PUSCH Physical Uplink Shared Channel
PUCCH Physical Uplink Control Channel
RB Resource Block
RE Resource Element
RNC Radio Network Controller
RRC Radio Resource Control
RRH Remote Radio Head
RRU Remote Radio Unit
SC-FDMA Single Carrier-Frequency Division Multiple Access
sPDCCH Short Physical Downlink Control Channel
sPDSCH Short Physical Downlink Shared Channel
sPUSCH Short Physical Uplink Shared Channel
sTTI Short Transmission Time Interval
TDD Time Division Duplex
TFRE Time Frequency Resource Element
TTI Transmission Time Interval
UCI Uplink Control Information
UE User Equipment
UL Uplink
WAN Wide Area Network

The invention claimed is:

1. A method for use in a wireless device, the method comprising:
    determining that the wireless device has scheduled parallel transmissions during a subframe, the parallel transmissions comprising one or more short transmission time interval, sTTI, transmissions, the parallel transmissions scheduled on two or more uplink, UL, physical channels, wherein the two or more UL physical channels comprise a control channel and a data channel; and
    distributing UL power among the parallel transmissions, wherein the UL power is distributed according to one or more prioritization rules, the one or more prioritization rules comprising at least the following prioritization rule:
        one or more of the sTTI transmissions comprising control information are prioritized over one or more of the sTTI transmissions comprising data without any control information such that one or more of the sTTI transmissions that use the control channel to transmit any of the control information are prioritized over one or more of the sTTI transmissions that use the data channel to transmit any of the control information, and the one or more of the sTTI transmissions that use the data channel to transmit any of the control information are prioritized over one or more of the sTTI transmissions that use the data channel to transmit data without any of the control information.

2. The method of claim 1, further comprising:
    determining that the wireless device has a limited UL power for the parallel transmissions scheduled during the subframe.

3. The method of claim 1, wherein the parallel transmissions further comprise one or more TTI transmissions, each of the one or more TTI transmissions having a longer transmission time interval than each of the one or more sTTI transmissions, and wherein the one or more prioritization rules further comprise at least the following prioritization rules:
    the one or more sTTI transmissions are prioritized over the one or more TTI transmissions; and
    one or more of the TTI transmissions that include any of the control information are prioritized over one or more of the TTI transmissions that do not include any of the control information.

4. The method of claim 3, wherein:
    each of the one or more sTTI transmissions has a duration of less than 1 millisecond, ms; and
    each of the one or more TTI transmissions has a duration of 1 ms.

5. The method of claim 3, wherein at least one of the one or more TTI transmissions has a configuration according to Long Term Evolution, LTE, Release 8.

6. The method of claim 3, wherein the one or more sTTI transmissions are scheduled on a different carrier than the one or more TTI transmissions.

7. The method of claim 3, wherein the one or more sTTI transmissions are scheduled only at the beginning of the subframe, and wherein distributing the UL power for the subframe comprises:

distributing a first amount of UL power for the one or more sTTI transmissions, wherein the first amount of UL power satisfies the UL power needed for the one or more sTTI transmissions;
calculating remaining UL power by deducting the first amount of UL power from a total UL power allowed or available to the wireless device; and
distributing the remaining UL power for the one or more TTI transmissions.

8. The method of claim 3, wherein the subframe has a start time (tstart), and wherein distributing the UL power for the subframe comprises:
determining all of the UL transmissions that have been scheduled for the subframe as of a pre-determined time (t0), the pre-determined time based on an amount of time before the subframe start time (tstart-Δ); and
distributing a first amount of UL power for the one or more sTTI transmissions, wherein the first amount of UL power satisfies the UL power needed for the one or more sTTI transmissions that have been scheduled for the subframe as of the pre-determined time (t0);
calculating remaining UL power by deducting the first amount of UL power from a total UL power allowed or available to the wireless device; and
distributing the remaining UL power for the one or more TTI transmissions.

9. The method of claim 8, wherein distributing the remaining UL power for the one or more TTI transmissions comprises:
distributing less UL power to the one or more TTI transmissions for a portion of the subframe during which the one or more sTTI transmissions have been scheduled; and
distributing more UL power to the one or more TTI transmissions for a portion of the subframe during which the one or more sTTI transmissions have not been scheduled.

10. The method of claim 8, further comprising:
determining that at least one of the one or more sTTI transmissions in the subframe did not get scheduled until after the pre-determined time (t0); and
re-distributing the UL power available for the one or more TTI transmissions during transmission of the one or more sTTI(s) that did not get scheduled until after the pre-determined time (to).

11. The method of claim 1, further comprising:
determining that the UL power is not sufficient for the parallel transmissions; and
using a common factor to scale the UL power for the one or more of the sTTI transmissions that use the data channel to transmit data without any of the control information.

12. The method of claim 1, wherein distributing the UL power among the parallel transmissions comprises:
upon determining that one or more of the sTTI transmissions are scheduled on the control channel, reserving a first amount of UL power for the one or more sTTI transmissions scheduled on the control channel;
calculating a first amount of remaining UL power by deducting the reserved first amount of UL power from a total UL power allowed or available to the wireless device;
upon determining that one or more of the sTTI transmissions are scheduled on the data channel and include any of the control information, reserving a second amount of UL power from the first amount of remaining UL power for the one or more sTTI transmissions scheduled on the data channel and including any of the control information;
calculating a second amount of remaining UL power by deducting the reserved second amount of UL power from the calculated first amount of remaining UL power; and
upon determining that one or more of the sTTI transmissions are scheduled on the data channel and do not include any of the control information, reserving a third amount of UL power from the second amount of remaining UL power for the one or more sTTI transmissions scheduled on the data channel and not including any of the control information.

13. The method of claim 1, further comprising transmitting the parallel transmissions according to the distribution of UL power.

14. The method of claim 1, wherein each of the one or more sTTI transmissions is scheduled in the middle of the subframe.

15. The method of claim 1, wherein the length of the subframe is 1 ms.

16. The method of claim 1, wherein the one or more sTTI transmissions comprise a first sTTI transmission and a second sTTI transmission, each having a duration less than 1 millisecond, wherein the first sTTI has a shorter duration than the second sTTI and wherein the prioritization rule for distributing UL power prioritizes the first sTTi over the second sTTi.

17. A wireless device comprising memory operable to store instructions and processing circuitry operable to execute the instructions, whereby the wireless device is operable to:
determine that the wireless device has scheduled parallel transmissions during a subframe, the parallel transmissions comprising one or more short transmission time interval, sTTI, transmissions, the parallel transmissions scheduled on two or more uplink, UL, physical channels, wherein the two or more UL physical channels comprise a control channel and a data channel; and
distribute UL power among the parallel transmissions, wherein the UL power is distributed according to one or more prioritization rules, the one or more prioritization rules comprising at least the following prioritization rule:
one or more of the sTTI transmissions comprising control information are prioritized over one or more of the sTTI transmissions comprising data without any control information such that one or more of the sTTI transmissions that use the control channel to transmit any of the control information are prioritized over one or more of the sTTI transmissions that use the data channel to transmit any of the control information, and the one or more of the sTTI transmissions that use the data channel to transmit any of the control information are prioritized over one or more of the sTTI transmissions that use the data channel to transmit data without any of the control information.

18. The wireless device of claim 17, wherein the wireless device is further operable to:
determine that the wireless device has a limited UL power for the parallel transmissions scheduled during the subframe.

19. The wireless device of claim 17, wherein the parallel transmissions further comprise one or more TTI transmissions, each of the one or more TTI transmissions having a longer transmission time interval than each of the one or more sTTI transmissions, and wherein the one or more prioritization rules further comprise at least the following prioritization rules:

the one or more sTTI transmissions are prioritized over the one or more TTI transmissions; and one or more of the TTI transmissions that include any of the control information are prioritized over one or more of the TTI transmissions that do not include any of the control information.

20. The wireless device of claim 19, wherein:

each of the one or more sTTI transmissions has a duration of less than 1 millisecond, ms; and each of the one or more TTI transmissions has a duration of 1 ms.

21. The wireless device of claim 19, wherein at least one of the one or more TTI transmissions has a configuration according to Long Term Evolution, LTE, Release 8.

22. The wireless device of claim 19, wherein the one or more sTTI transmissions are scheduled only at the beginning of the subframe, and wherein to distribute the UL power for the subframe, the wireless device is further operable to:

distribute a first amount of UL power for the one or more sTTI transmissions, wherein the first amount of UL power satisfies the UL power needed for the one or more sTTI transmissions;

calculate remaining UL power by deducting the first amount of UL power from a total UL power allowed or available to the wireless device; and distribute the remaining UL power for the one or more TTI transmissions.

23. The wireless device of claim 19, wherein the subframe has a start time (tstart), and wherein to distribute the UL power for the subframe, the wireless device is further operable to:

determine all of the UL transmissions that have been scheduled for the subframe as of a pre-determined time (t0), the pre-determined time based on an amount of time before the subframe start time (tstart-$\Delta$); and distribute a first amount of UL power for the one or more sTTI transmissions, wherein the first amount of UL power satisfies the UL power needed for the one or more sTTI transmissions that have been scheduled for the subframe as of the pre-determined time (t0);

calculate remaining UL power by deducting the first amount of UL power from a total UL power allowed or available to the wireless device; and distribute the remaining UL power for the one or more TTI transmissions.

24. The wireless device of claim 23, wherein to distribute the remaining UL power for the one or more TTI transmissions, the wireless device is further operable to:

distribute less UL power to the one or more TTI transmissions for a portion of the subframe during which the one or more sTTI transmissions have been scheduled; and distribute more UL power to the one or more TTI transmissions for a portion of the subframe during which the one or more sTTI transmissions have not been scheduled.

25. The wireless device of claim 23, wherein the wireless device is further operable to:

determine that at least one of the one or more sTTI transmissions in the subframe did not get scheduled until after the pre-determined time (t0); and re-distribute the UL power available for the one or more TTI transmissions during transmission of the one or more sTTI(s) that did not get scheduled until after the pre-determined time (t0).

26. The wireless device of claim 17, the wireless device further operable to:

determine that the UL power is not sufficient for the parallel transmissions; and use a common factor to scale the UL power for the one or more of the sTTI transmissions that use the data channel to transmit data without any of the control information.

27. The wireless device of claim 17, wherein to distribute the UL power among the parallel transmissions comprises, the wireless device is operable to:

upon determining that one or more of the sTTI transmissions are scheduled on the control channel, reserve a first amount of UL power for the one or more sTTI transmissions scheduled on the control channel;

calculate a first amount of remaining UL power by deducting the reserved first amount of UL power from a total UL power allowed or available to the wireless device;

upon determining that one or more of the sTTI transmissions are scheduled on the data channel and include any of the control information, reserve a second amount of UL power from the first amount of remaining UL power for the one or more sTTI transmissions scheduled on the data channel and including any of the control information;

calculate a second amount of remaining UL power by deducting the reserved second amount of UL power from the calculated first amount of remaining UL power; and upon determining that one or more of the sTTI transmissions are scheduled on the data channel and do not include any of the control information, reserve a third amount of UL power from the second amount of remaining UL power for the one or more sTTI transmissions scheduled on the data channel and not including any of the control information.

28. The wireless device of claim 17, wherein the wireless device is further operable to transmit the parallel transmissions according to the distribution of UL power.

29. The wireless device of claim 17, wherein each of the one or more sTTI transmissions is scheduled in the middle of the subframe.

30. The wireless device of claim 17, wherein the length of the subframe is 1 ms.

31. The wireless device of claim 17, wherein the one or more sTTI transmissions comprise a first sTTI transmission and a second sTTI transmission, each having a duration less than 1 millisecond, wherein the first sTTI has a shorter duration than the second sTTI and wherein the prioritization rule for distributing UL power prioritizes the first sTTi over the second sTTi.

32. A computer program product comprising a non-transitory computer readable medium storing computer readable program code, the computer readable program code comprises:

program code for determining that a wireless device has scheduled parallel transmissions during a subframe, the parallel transmissions comprising one or more short transmission time interval, sTTI, transmissions, the parallel transmissions scheduled on two or more uplink, UL, physical channels, wherein the two or more UL physical channels comprise a control channel and a data channel; and program code for distributing UL power among the parallel transmissions, wherein the UL power is distributed according to one or more prioritization rules, the one or more prioritization rules comprising at least the following prioritization rule:

one or more of the sTTI transmissions comprising control information are prioritized over one or more of the sTTI transmissions comprising data without any control information such that one or more of the sTTI transmissions that use the control channel to transmit any of the control information are prioritized over one or more of the sTTI transmissions that use the data channel to transmit any of the control information, and the one or more of the sTTI transmissions that use the data channel to transmit any of the control information are prioritized over one or more of the sTTI transmissions that use the data channel to transmit data without any of the control information.

\* \* \* \* \*

UNITED STATES PATENT AND TRADEMARK OFFICE
CERTIFICATE OF CORRECTION

PATENT NO. : 10,785,727 B2
APPLICATION NO. : 16/337811
DATED : September 22, 2020
INVENTOR(S) : Falconetti et al.

Page 1 of 1

It is certified that error appears in the above-identified patent and that said Letters Patent is hereby corrected as shown below:

In the Specification

In Column 1, Line 6, delete "U.S.," and insert -- U.S. --, therefor.

In Column 1, Line 7, delete "international" and insert -- International --, therefor.

In Column 1, Line 12, delete "in, their" and insert -- in their --, therefor.

In Column 1, Lines 50-57, delete "Radio resource.....system." and insert the same at Line 51, as a new paragraph.

In Column 2, Lines 26, delete "$\hat{P}_{PUCCH}(i)$ the" and insert -- $\hat{P}_{PUCCH}(i)$ is the --, therefor.

In Column 2, Lines 49-50, delete "fc(i)= fc(i-1)+δPUSCH,c(i-KPUSCH)," and
insert -- fc(i)= fc(i-1)+δPUSCH,c(i-KPUSCH). --, therefor.

In Column 3, Lines 20, delete "ΔTT,c(i)" and insert -- ΔTF,c(i) --, therefor.

In Column 12, Line 29, delete "time to." and insert -- time t0. --, therefor.

In Column 13, Line 50, delete "and/or or" and insert -- and/or --, therefor.

In Column 14, Line 60, delete "and/or or" and insert -- and/or --, therefor.

In Column 15, Line 52, delete "and/or or" and insert -- and/or --, therefor.

In the Claims

In Column 25, Line 46, in Claim 10, delete "pre-determined time (to)." and insert -- pre-determined time (t0). --, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*